United States Patent [19]

Nanya et al.

[11] Patent Number: 4,459,035
[45] Date of Patent: Jul. 10, 1984

[54] ALL SOLID-STATE COMPLEMENTARY ELECTROCHROMIC DISPLAY DEVICE

[75] Inventors: Takanori Nanya, Sayama; Eigo Hashimoto, Sakado, both of Japan

[73] Assignee: Citizen Watch Co., Ltd., Tokyo, Japan

[21] Appl. No.: 448,711

[22] Filed: Dec. 10, 1982

[30] Foreign Application Priority Data

Dec. 28, 1981 [JP] Japan ................................ 56-210378

[51] Int. Cl.$^3$ ............................................ G04B 23/02
[52] U.S. Cl. .................................. 368/241; 368/239; 340/763; 340/785; 340/812
[58] Field of Search ............... 350/357; 368/239, 241, 368/242; 340/763, 785, 812

[56] References Cited

U.S. PATENT DOCUMENTS

| | | | |
|---|---|---|---|
| 4,306,774 | 12/1981 | Nicholson | 350/357 |
| 4,350,414 | 9/1982 | Takahashi | 350/357 |
| 4,392,721 | 7/1983 | Giglia et al. | 350/357 |
| 4,401,983 | 8/1983 | Tabata et al. | 350/357 |
| 4,401,984 | 8/1983 | Tabata et al. | 350/357 |

FOREIGN PATENT DOCUMENTS 2083261  3/1982  United Kingdom .

Primary Examiner—Bernard Roskoski
Attorney, Agent, or Firm—Koda and Androlia

[57] ABSTRACT

EC display device suitable for drive by means of a charge transfer method which is one of the methods for realizing a constant charge drive, in which all the members comprise solid materials only and a reduction coloration type EC material and an oxidation coloration type EC material are combined. The device has means for applying a voltage between each of the EC segments, with the counter electrode shut off, and a fixed quantity of electric charge is transferred from one EC segment to another. The counter EC layer provided on the counter electrode functions as a donnor or an acceptor of protons so as to activate the EC reactions and this counter layer is colored or bleached by itself, producing double contrast of the display.

9 Claims, 10 Drawing Figures

4,459,035

ALL SOLID-STATE COMPLEMENTARY ELECTROCHROMIC DISPLAY DEVICE

BACKGROUND OF THE INVENTION

1. Field of the Invention

This invention relates to a display device using electrochromic (EC) materials exhibiting a reversible color change taken place as a result of an electrochemical redox reaction and to a method of driving the display device.

2. Prior Art

In a display device in which a film of an EC material such as tungsten oxide is arranged in the form of a plurality of segments, the coloration density of each of the segments is determined by the quantity of electric charge injected therein. In order to drive these display segments at all times with a uniform coloration density, it is necessary to maintain constant the quantity of electric charge to be transferred. Since the conductivities of EC materials and electrolytes vary with ambient temperatures, a complicated temperature compensating circuit is required to realize a constant electric charge drive.

As means for avoiding this difficulty, Tabata et al, in U.K. Patent Application GB 2,083,261A have disclosed a driving method called a charge transfer method together with a liquid type display device using $WO_3$ as the EC material. With this display device, a voltage is applied between the colored segment and the colorless segment and the electric charge is transferrd from one segment to another. After the electric charge previously injected in one segment has been transferred to another segment, current flow is naturally stopped. In this way, a constant electric charge drive is assured independent of ambient temperature.

As the electrolyte, however, their display device uses a liquid electrolyte which causes leakage and thus corrosion in the electrode film. In order to eliminate these problems, a solid electrolyte such as an ion permeable solid insulator may be used in place of the liquid electrolyte. But this will create new problems such as delay in the response times of the device, poor coloration density, and degradation of the device owing to the evolution of hydrogen gas.

SUMMARY OF THE INVENTION

Therefore, one of the objects of the present invention is to provide an all solid-state EC display device which is suitable for drive by means of the charge transfer method.

Another object of the present invention is to provide an EC display device having an enhanced coloration density.

A further object of the present invention is to provide an EC display device having short response times and extended service life.

For the aforementioned objects, there is provided an EC display device comprising: a transparent substrate; a plurality of transparent segmented electrodes formed on a surface of said transparent substrate; EC segments formed on said transparent segmented electrodes, said EC segments being formed of one of an oxidation coloration type EC material and a reduction coloration type EC material; a counter EC layer positioned apart opposite to said EC segments, said counter EC layer being formed of the other of the oxidation coloration type EC material and the reduction coloration type EC material; an ion permeable solid insulating layer interposed between said EC segments and said counter EC layer; a counter electrode provided outside said counter EC layer; first means for applying direct current voltage across said counter EC layer and said transparent segmented electrodes; and second means for applying direct current voltage between each of said transparent segmented electrodes; whereby said first means apply the direct current voltage across said counter electrode and a part of said transparent segmented electrodes so that the corresponding part of the EC segments and a part of the counter EC layer positioned opposite are colored and then said second means apply the direct current voltage between a colorless EC segment to be colored and a colored EC segment to be bleached through each of said transparent segmented electrodes so that electric charge injected in said colored EC segment is transferred to said colorless EC segment through said counter EC layer so as to provide a display.

DETAILED DESCRIPTION OF THE INVENTION

Figure 1:
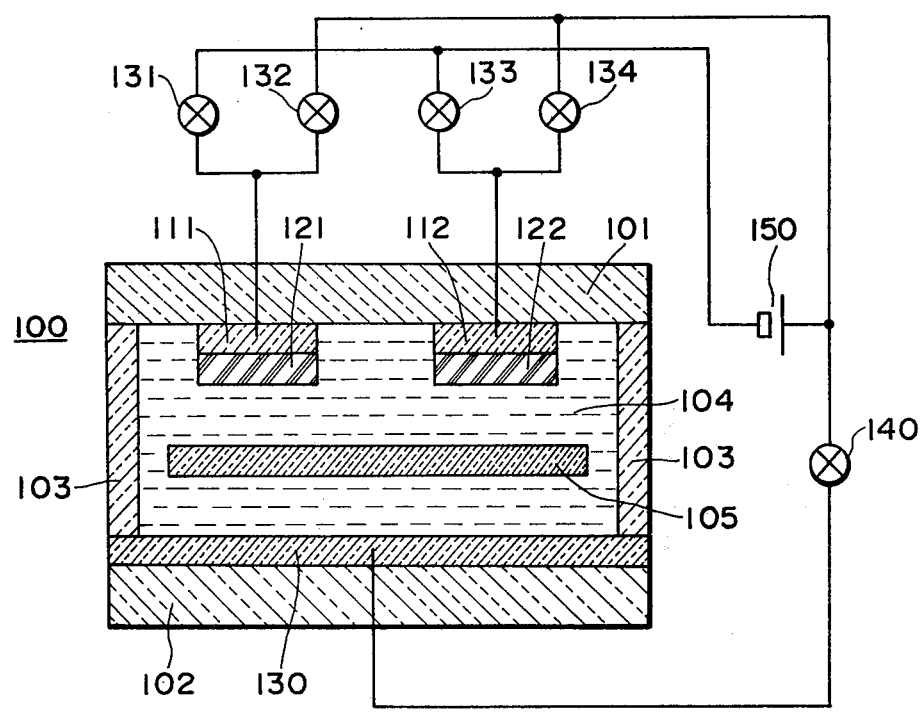
FIG. 1 is a sectional view of a prior art EC display device.

Referring now in detail to the drawings, FIG. 1 is a sectional view of the EC display device disclosed in U.K. Patent Application GB 2,083,261A by Tabata, et al. With reference to FIG. 1, the structure of a prior art EC display device and its driving method, called a charge transfer method will be explained. Disposed on one surface of a transparent substrate 101 are transparent segmented electrodes 111 and 112 and formed thereon are EC segments 121 and 122 of films of tungsten trioxide ($WO_3$). On the other hand, on one surface of a counter substrate 102 is positioned a counter electrode 130. These substrates 101 and 102 are sealed with a spacer 103 at their peripheral portions. Thus, an enclosed container, that is, a cell 100 is fabricated. The cell 100 is filled with a liquid electrolyte 104 internally. A member illustrated at 105 is a white porous screen for shielding the counter electrode 130 and serving as a background of the display. The counter electrode 130 is connected to the positive side of a DC power source 150 through a switch 140. On the other hand, the transparent segmented electrodes 111 and 112 are connected to the negative side of the DC power source 150 through switches 131 and 133 and to the positive side of the DC power source 150 through switches 132 and 134, respectively. This display device is driven by means of the charge transfer method comprising the following procedure:

First, the switches 133 and 140 are closed and a voltage is applied across the counter electrode 130 and the transparent segmented electrode 112. Then, the EC segment 122 is in a colored state following reaction (1):

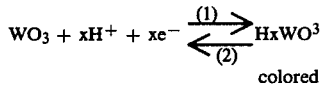

$$\text{colored}$$

In this process, the coloration density depends on the quantity of injected electric charge, x, and x depends on the applied voltage, applied time and ambient temperature. This driving method is called a counter driving method. Next, with the switches 133 and 140 open and the seitches 131 and 134 closed, a voltage is applied between the colored EC segment 122 and the colorless EC segment 121. By doing this, the EC segment 122 produces the above reaction (2) and the EC segment 121 produces the above reaction (1), transferring the electric charge from one segment 122 to the other segment 121. The quantity of electric charge transferred in this process is equivalten to that previously injected in the segment 122. Thus, the quantity of electric charge is fixed independent of ambient temperature. This driving method is called a charge transfer driving method.

Figure 2A:
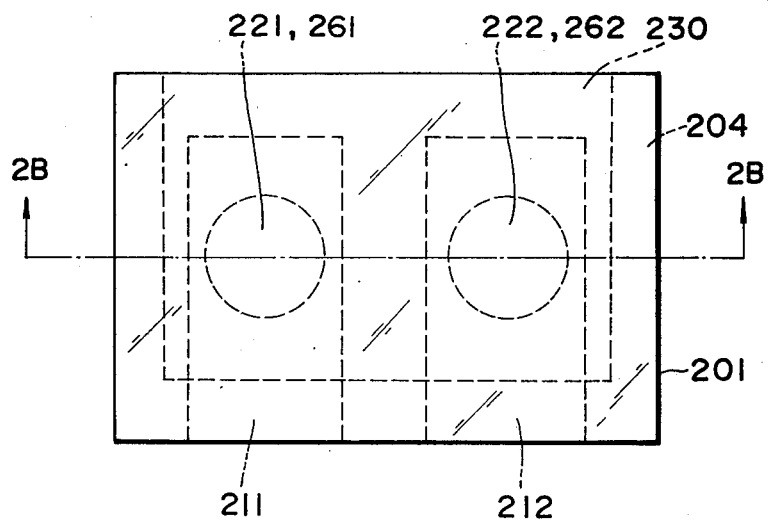
FIG. 2A is a plan view of an EC display device according to the invention.
Figure 2B:
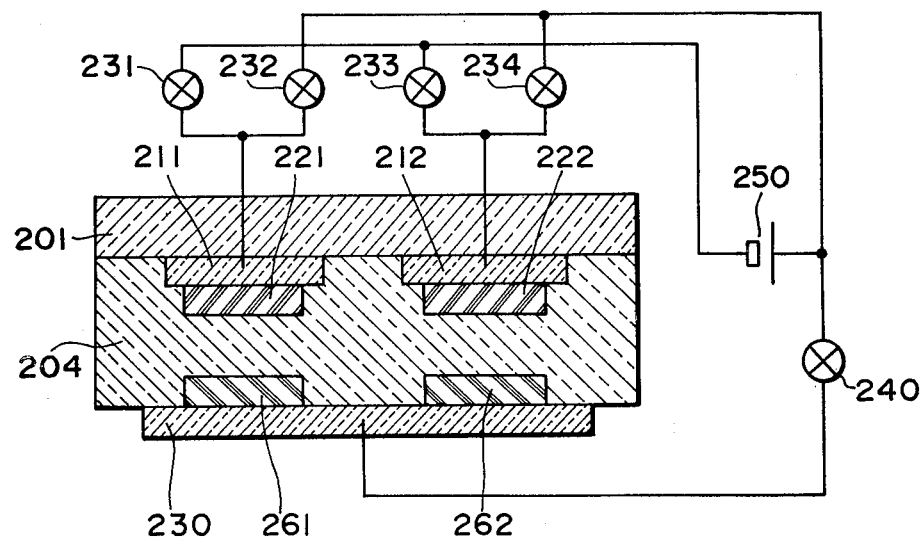
FIG. 2B is a sectional view taken substantially on line 2B—2B of FIG. 2A.

FIG. 2A is a plan view of an EC display device according to the invention and FIG. 2B is a sectional view of FIG. 2A. Disposed on one surface of a transparent substrate 201 are transparent segmented electrodes 211 and 212 and formed thereon are EC segments 221 and 222 made of films of tungsten trioxide (WO₃) which is a reduction coloration type EC material. These EC segments 221 and 222 are positioned opposite to counter EC layers 216 and 262 made of films of iridium hydroxide [Ir(OH)n] which is an oxidation coloration type EC material, and a layer of tantalum oxide is interposed therebetween as an ion permeable solid insulating layer 204. Positioned outside the counter EC layers 261 and 262 is a counter electrode 230 which is connected to the positive side of a DC power source 250 through a switch 240. The segmented electrodes 211 and 212 are connected to the negative side of the power source 250 through the switches 231 and 233 and to the positive side of the power source 250 through the switches 232 and 234. When compared to the prior art EC display device illustrated in FIG. 1, features of the device according to the invention include the combination of two types of EC materials, that is, a reduction coloration type and an oxidation coloration type EC material layers which behave complementarily and a structure in which all the elements are formed of solid-state materials. Such a display device is disclosed in U.S. Pat. No. 4,350,414 issued on Sept. 21, 1982 to Takahashi et al. This patent, however, does not disclose means for transferring the electric charge from one display segment to another by the application of a voltage therebetween.

Figure 3A:
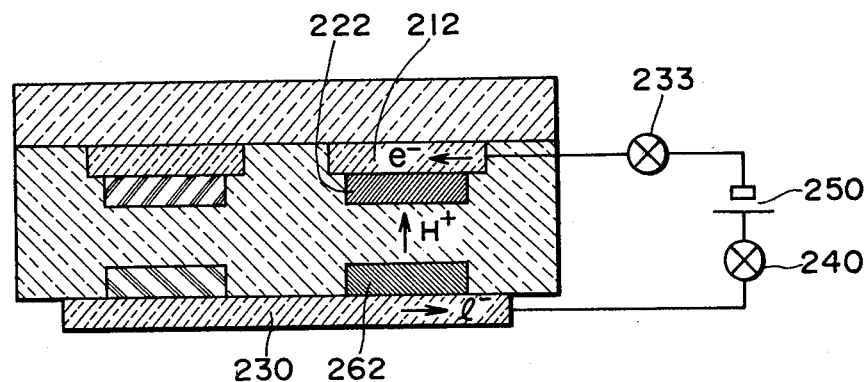
FIGS. 3A, 3B and 3C are sectional views to help explain the drive of the display device of FIGS. 2A and 2B.

The display device of the invention is characterized in that there is provided such means. The method for driving the means will be explained with reference to FIGS. 3A, 3B and 3C. As shown in FIG. 3A, the counter electrode 230 is connected to the positive side of the power source 250 through the switch 240, and a transparent segmented electrode 212 is connected to the negative side thereof through the switch 233. At this time, the counter EC layer 262 whose electric charge is extracted is colored by the following reaction (3):

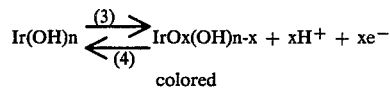

$$\text{colored}$$

Figure 3B:
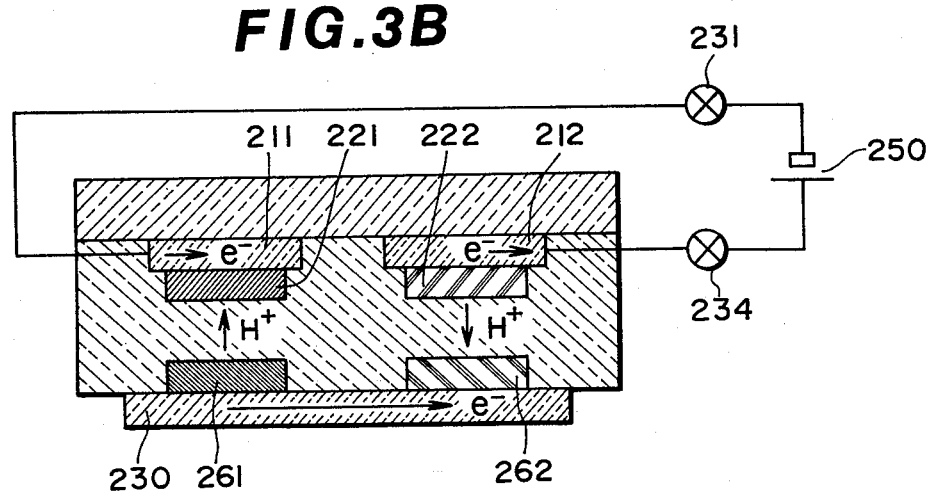
Figure 3C:
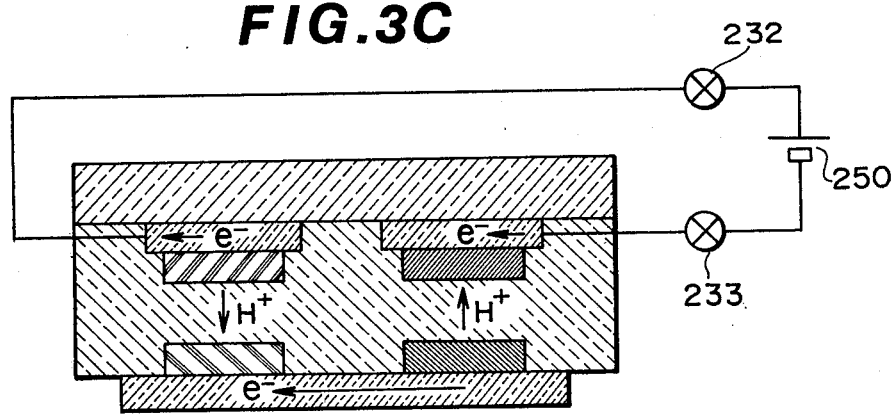

On the other hand, the EC segment 222 into which the electric charge is injected also becomes colored by the aforementioned reaction (1). The coloration density in this process depends on the ambient temperature and drive conditions, and therefore the device can be controlled so as to obtain the desired coloration density. Thus, after driving a part of the EC segments to produce the desired coloration density, the switch 240 is opened to shut off the voltage supply to the counter electrode 230, and then the device is switched to the drive by means of the charge transfer method as shown in FIGS. 3B and 3C. In this driving method, as shown in FIG. 3B, a voltage is applied between the colored EC segment 222 to be bleached and the colorless EC segment 221 to be colored. At this time, the aforementioned reactions (1), (2), (3) and (4) proceed in the EC segment 221, EC segment 222, counter EC layer 261 and counter EC layer 262, respectively. As illustrated in FIG. 3B, the electric charge is transferred and the EC segment 221 and the counter EC layer 261 are in the colored state instead of the EC segment 222 and the counter EC layer 262.

In the EC display device according to the invention, the counter EC layers 261 and 262 provided on one side of the counter electrode 230 function as an acceptor of protons, thus completely preventing evolution of hydrogen gas on the surface of the counter electrode 230. In addition, since the EC segment and the counter EC layer positioned opposite are in their colored state at the same time by a series of reactions, the contrast of the display is doubled. Furthermore, since the EC segment and the counter EC layer exchange their roles as a donor and an acceptor of protons, the impedance of the interface is decreased and short response times are realized. As the reduction coloration type EC material, MoO₃ can be used besides WO₃. As the oxidation coloration type EC material, Rh(OH)n or Ni(OH)n can be used besides Ir(OH)n. Similarly, as the ion permeable solid insulator, Cr₂O₃ or SiO₂ can be used besides Ta₂O₅. In the embodiment illustrated in FIGS. 2A and 2B, the EC material layer of the reduction coloration type is deposited on the side of the transparent substrate 201 and the EC material layer of the oxidation coloration type is on the side of the counter electrode 230. It is obvious, however, that if these layers are exchanged, the objects of the invention will be attained. In this case, the switch 240 should be connected to the negative side of the power source 250.

Figure 4:
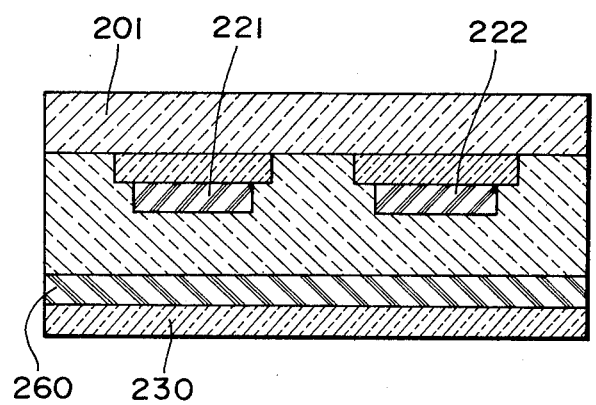
FIG. 4 is a sectional view of an EC display device of another embodiment according to the invention.

In FIGS. 2A and 2B, the counter EC layers 261 and 262 are divided into a plurality of parts so as to form the same pattern as in the EC segments 221 and 222. As shown in FIG. 4, however, the counter EC layer 260 may be formed of a continuous layer covering all the EC segments 221 and 222. In this case, only a part of the counter EC layer 260 right opposite to the EC segments 221 and 222 contributes to the EC reaction. It should be understood that these sectional views are not to scale, the thickness of each of the film members except for the transparent substrate 201 being depicted much larger in relation to the width.

Figure 5:
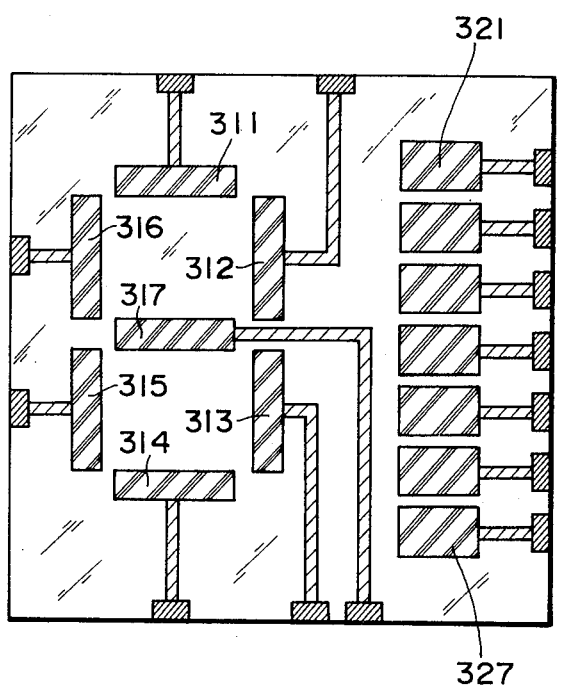
FIG. 5 is a plan view illustrating an EC segment array of an EC display device according to the invention.

FIG. 5 is a plan view of an EC segment array of the device according to the invention. The EC segments comprise display EC segments 311 to 317 arrayed in the form of numeral eight and support EC segments 321 to 327. The areas of the EC segments are designed to be the same so as to exhibit a fixed coloration density. Before the display EC segments 311 to 317 are selectively colored to display any numeral from 0 to 9, the support EC segments 321 to 327 are in their colored state by use of a counter electrode (not shown). Next, the display EC segments to be colored are selected and a voltage is applied between the selected EC display segments and the same number of support EC segments. Thus, the electric charge is transferred from the latter to the former. When the display is rewritten, the electric charge is transferred between the display EC segments to be colored and the display EC segments to be bleached, or between the display EC segments and the support EC segments. In this manner, the display device is driven at all times with a uniform coloration density.

Figure 6:
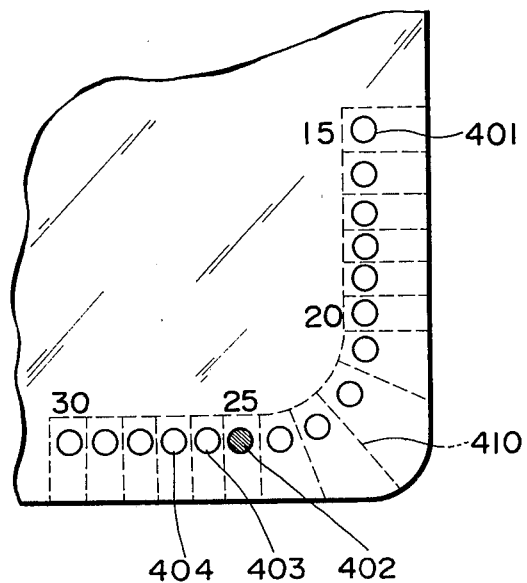
FIG. 6 is a plan view illustrating an electronic watch having an EC display device of an embodiment according to the invention.

FIG. 6 shows a sweep display of the seconds of time using the driving method of the invention. A total of sixty display EC segments are made in the form of circles to display each second and this figure shows the section of 15 to 30 seconds, indicating 25 seconds. Dashed lines 410 denote the boundaries between the adjacent segmented electrodes. The drive by means of the charge transfer method is possible by applying a positive voltage to a colored display segment 402 and a negative voltage to a colorless display segment 403. After one second, the similar operation is performed between the colored display segment 403 and the colorless display segment 404, thereby transferring the electric charge in sequence.

Figure 7:
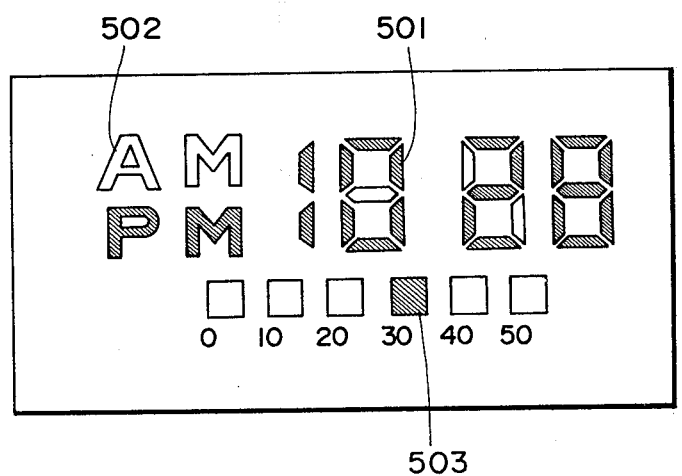
FIG. 7 is a plan view illustrating an electronic watch having a display device of another embodiment according to the invention.

FIG. 7 illustrates a display panel for an electronic timepiece in which the charge transfer method of this invention is combined with the conventional counter driving method for displaying time by the application of a voltage across the segmented electrode and the counter electrode. This figure indicates 10 hours 28 minutes 30 seconds p.m. An hour and minute display section 501 is driven by the counter driving method. An AM/PM display section 502 and a second display section 503 are driven by the electric charge transfer method. This embodiment needs no support segment.

As already stated above, the EC display device of the present invention is in all solid-state display device using a solid electrolyte. Thus, the device has overcome the problem of leakage in the conventional EC device using a liquid electrolyte and the problem of corrosion of the electrode films due to corrosive electrolyte. In the EC display device of the present invention, the counter EC layer positioned on the side of the counter electrode functions as an acceptor of protons, thereby completely preventing evolution of hydrogen gas on the surface of the counter electrode and thus extending the service life of the device. In addition, the EC segments and the counter EC layer are colored at the same time by a series of reactions, producing double contrast of the display. Furthermore, the EC segments and the counter EC layer exchange their roles as a donnor and an acceptor of protons, thus reducing the impedance of the interface and realizing short response times.

What is claimed is:

1. An EC display device comprising:
   a transparent substrate;
   a plurality of transparent segmented electrodes formed on a surface of said transparent substrate;
   EC segments formed on said transparent segmented electrodes, said EC segments being formed of one of an oxidation coloration type EC material and a reduction coloration type EC material;
   a counter EC layer positioned apart opposite to said EC segments, said counter EC layer being formed of the other of the oxidation type EC material and the reduction coloration type EC material;
   an ion permeable solid insulating layer interposed between said EC segments and said counter EC layer;
   a counter electrode provided outside said counter EC layer;
   first means for applying direct current voltage across said counter EC layer and said transparent segmented electrodes; and
   second means for applying direct current voltage between each of said transparent segmented electrodes;
   whereby said first means apply the direct current voltage across said counter electrode and a part of said transparent segmented electrodes so that the corresponding part of the EC segments and a part of the counter EC layer positioned opposite are colored and then said second means apply the direct current voltage between a colorless EC segment to be colored and a colored EC segment to be bleached through each of said transparent segmented electrodes so that electric charge injected in said colored EC segment is transferred to said colorless EC segment through said counter EC layer so as to provide a display.

2. The display device according to claim 1 wherein said oxidation coloration type EC material is iridium hydroxide [Ir(OH)n] and said reduction coloration type EC material is tungsten trioxide ($WO_3$).

3. The display device according to claim 1 wherein said ion permeable solid insulating layer is tantalum oxide ($Ta_2O_5$).

4. The display device according to claim 1 wherein said counter EC layer is divided into a plurality of parts so as to form the same pattern as that of said EC segments.

5. The display device according to claim 1 wherein said counter EC layer is a continuous layer covering all the EC segments.

6. The display device according to claim 1 wherein all the EC segments are of the same area.

7. The display device according to claim 1 wherein said EC segments are divided into display EC segments comprising seven segments arrayed in the form of numeral eight and a plurality of support EC segments arrayed near said display EC segments.

8. An electronic timepiece having a display device comprising:
   a transparent substrate;
   a plurality of transparent segmented electrodes formed on a surface of said transparent substrate;
   EC segments formed on said transparent segmented electrodes, said EC segments being formed of one of an oxidation coloration type EC material and a reduction coloration type EC material;
   a counter EC layer positioned apart opposite to said EC segments, said counter EC layer being formed of the other of the oxidation coloration type EC material and the reduction coloration type EC material;

an ion permeable solid insulating layer interposed between said EC segments and said counter EC layer;

a counter electrode provided outside said counter EC layer;

first means for applying direct current coltage across said counter layer and said transparent segmented electrodes; and second means for applying direct current voltage between each of said transparent segmented electrodes;

whereby said first means apply the direct current voltage across said counter electrode and a part of said transparent segmented electrodes so that the corresponding part of the EC segments and a part of the counter EC layer positioned opposite are colored and then the second means apply the direct current voltage between a colorless EC segment to be colored and a colored EC segment to be bleached through each of said transparent segmented electrode so that electric charge injected in said colored EC segment is transferred to said colorless EC segment through said counter EC layer so as to provide a display.

9. The electronic timepiece according to claim 8 further comprising a display device, said display device displaying time by the application of the direct current voltage between said segmented electrodes and said counter EC layer.

* * * * *